United States Patent [19]

Haber

[11] Patent Number: 4,860,241

[45] Date of Patent: Aug. 22, 1989

[54] METHOD AND APPARATUS FOR CELLULAR DIVISION

[75] Inventor: Andrew J. Haber, Lauderdale Lakes, Fla.

[73] Assignee: Harris Corporation, Melbourne, Fla.

[21] Appl. No.: 924,664

[22] Filed: Oct. 30, 1986

[51] Int. Cl.$^4$ ................................................. G06F 7/52
[52] U.S. Cl. .................................................... 364/761
[58] Field of Search .................................. 364/761–767

[56] References Cited

U.S. PATENT DOCUMENTS

| | | | |
|---|---|---|---|
| 3,151,238 | 9/1964 | Symons | 364/761 |
| 3,803,393 | 4/1974 | Wang | 364/766 |
| 3,956,621 | 5/1976 | Booth | 364/766 |
| 4,161,032 | 7/1979 | Williams | 365/5 |
| 4,334,285 | 6/1982 | Kawakita | 364/761 |
| 4,374,427 | 2/1983 | Katayama | 364/761 |
| 4,380,051 | 4/1983 | Fette | 364/766 |
| 4,384,340 | 5/1983 | Tague et al. | 364/763 |
| 4,441,158 | 4/1984 | Kanuma | 364/764 |
| 4,503,512 | 3/1985 | Doran | 364/761 |

OTHER PUBLICATIONS

Newton, "An Implementation of the Stefanelli Multi--Valued Parallel Divider Array," 6th International Symposium on Multi-Valued Logic. Logun, Utah, U.S.A. (25–28 May 86), pp. 61–67.

Primary Examiner—Gary V. Harkcom
Assistant Examiner—Dale M. Shaw
Attorney, Agent, or Firm—Joel I. Rosenblatt

[57] ABSTRACT

A method and application for a cellular divider. The dividend is separated into P separate groups of b bits each. Division at the cellular level is accomplished on the groups in the respective order of place significance. Accordingly, the group representing the most significant bits of the dividend are used in the first cell and after division by the divisor, the remainder is transmitted to the next lower cell in the order of place significance, where the division process is repeated using the next lower group in the dividend order of place significance. The process is repeated successively for each lower cell using the remainder out of the next higher cell as a remainder in. Division is according to a set logic function for a given number of dividend group bits and divisor bits.

10 Claims, 3 Drawing Sheets

METHOD AND APPARATUS FOR CELLULAR DIVISION

BACKGROUND OF THE INVENTION

The present invention relates to the field of data processing systems and specifically to the field of cellular dividers and to a cellular apparatus and method for division within a data processing system.

Prior art data processing systems typically require divisions of numbers either using fixed point or floating point arithmetic or combinations of adders or other functioning units requiring arithmetic operations which are repeated until the divisional process is completed. Typically division algorithms use sequences of both addition and subtraction steps. The result of each iterative step is to form a portion of a quotient. The iterative process is continued until the complete quotient and the complete remainder is formed and them combined to form the final binary number.

Additionally, the data processing division circuits have been employed using cellular arrays wherein a circuit, representing a cell, is repeated many times and with each of the cells dedicated to a particular step in the divisional process.

SUMMARY OF THE INVENTION

This invention is an improvement on prior cellular dividers. It employs a series of cells with each cell being a combinational logic circuit. The dividend of N bits is separated into P groups of b bits each. Each of the cells is dedicated to a particular discrete one of the P groups, of b bits and placed relative to its respective groups position in the order of place significance of the numbers in the dividend. Each cell produces a quotient, with respect to its respective group and with respect to that group's place position in the order of numbers in the dividend.

In this way, a single pass is sequentially made through the connected cells. The cells are in turn arranged in the order of place significance of their respective group of b bits derived from the N bits of the dividend. The remainder out of each cell is passed to the next cells a remainder in and with the remainder output at the end of the least cell combined with the quotients of each cell to reconstitute the answer. The order of the quotients is in the same order as the related dividend groups producing those respective quotients.

The method shown is for dividing a number having positions arranged in an order of place significance, with each position in said number having a respective place in said order indicative of its value. The method first separates the divident numbers into P discrete groups of b respective numbers each. The P groups are maintained in the said respective order as in the dividend and each of the P groups of b respective numbers are then applied to separate respective cells. A number representing the divisor is similarly applied to each cell.

The divisor is then logically combined with each P discrete group to produce a part of the quotient and a remainder. In the method, the remainder, derived from logically combining the divisor with the most significant group of the dividend P groups is then applied to the next in order cell which contains the next most significant of said dividend P groups. The logical combination is then repeated in the next cell, in the decreasing order of place significance, using the remainder from the most higher significant cell, to produce a quotient and remainder. This remainder is then applied to the next successive cell in the order of decreasing place significance, which has as its input the next lower significant P group and the divisor similarly to produce a quotient and remainder. The process repeats sequentially through each cell to then Pth cell. The quotients from each of the first through the Pth cell are then combined and arranged in the same order of place significance as their respective dividend group and combined with the last remainder out from the Pth cell to form the complete quotient and remainder answer.

In the invention, the numbers representing th dividend, divisor, and remainder are represented by binary signals. As is known by one skilled in the art, the bonary signals are formed of bits ("1" or "0"), each bit having a position in an order of place significance and with each place having a value. As stated above, the binary number representing the dividend is separated into P groups of binary numbers of b bits each. The place position of each of the bits within each of the P groups and of the P groups are maintained relative to all of the other P groups so that the correct value of each of the bits in each of the P groups is maintained.

The process of division then requires a sequential logical combination each respective P group within the respective cell for that group with the divisor and the remainder in from the next higher cell in the said order of place significance. For example, the most significant of the P groups is placed in the first cell to produce a quotient, and with the remainder out from the cell also having a place position with respect to the place position of the dividend P group producing that remainder.

According to the principles of the invention, the cell logic may be arranged for any size dividend and for any size divisor by the process shown below. That process, according to the preferred embodiment uses a truth table based upon the possible combinations of dividend and divisor and quotient and remainder. From that truth table, a series of Boolean equations may be derived, as known to those skilled in the art, and the circuit logic is constructed accordingly.

The invention will now be described with reference to the preferred embodiment, as shown below.

Figure 1:
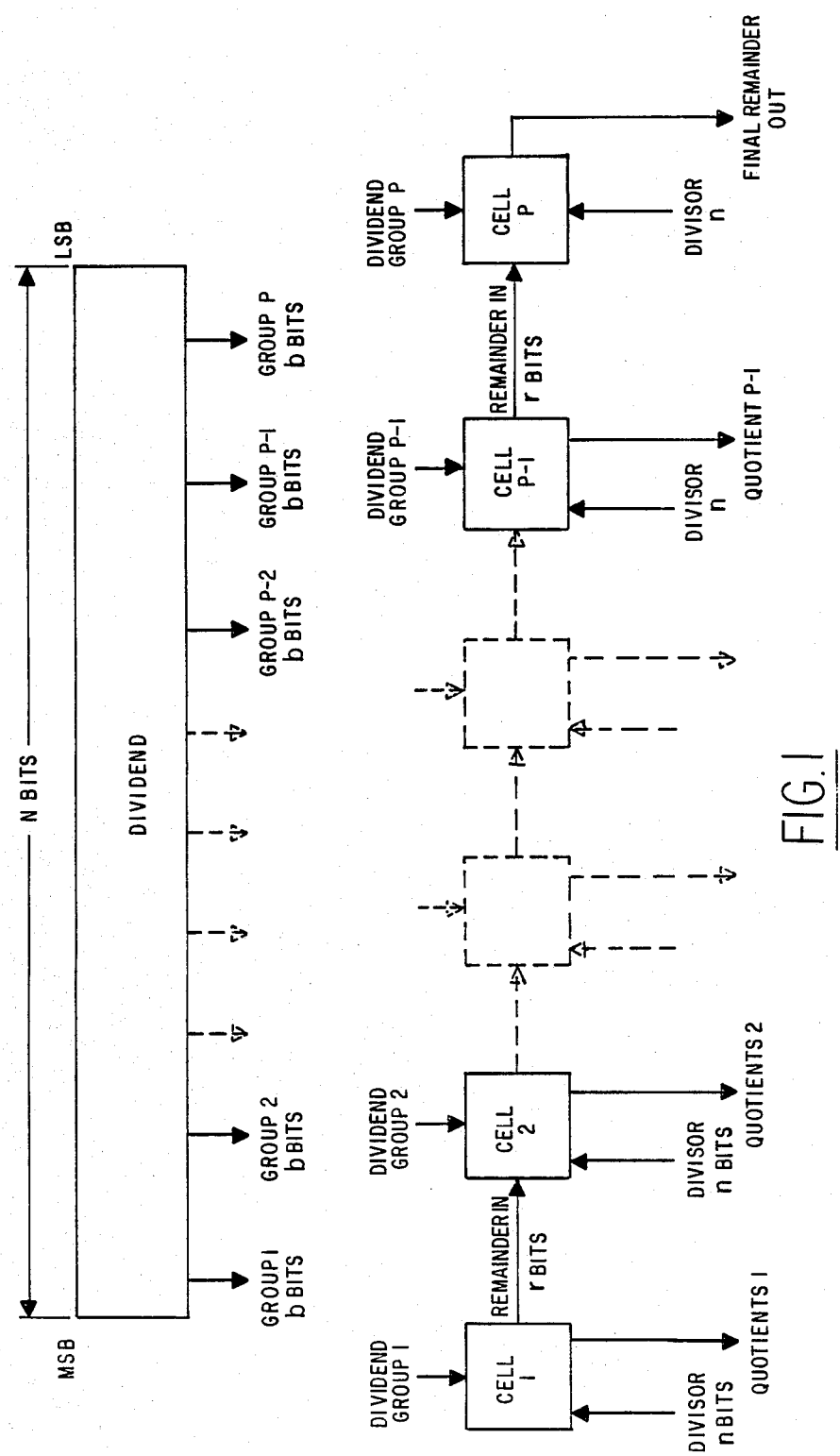
FIG. 1 shows an apparatus for practicing the invention, in schematic form.

The invention, in its preferred embodiment, and as illustrated by reference to FIG. 1 shows, in schematic form, division cells, shown as cells 1, 2, through to P-1 and finally to cell P. The inputs provided to each cell comprise a divisor and dividend. The dividend to each cell is derived from the complete dividend of N bits, which is separated into P separate discrete groups of b bits each, ($P \times b = N$).

As would be familiar to one skilled in the art, binary numbers and signals representing such binary numbers are arranged in place order with each place position in that order having a value. For example, in the binary system, the least significant bit (LSB) has a value of 20 and the most significant bit would have a value of $2^m$ where m is the place position of the most significant bit (MSB). The numerical value of the dividend, for example, would be the value of the separate numbers in each of the place positions, taken together with the place values for those respective numbers, as is well known.

In the preferred embodiment, and according to the inventive principle, the dividend, divisor, remainder, and quotient numbers are represented by binary signals. A dividend of N bits is separated into P groups of b bits each. Each of those separate P dividend groups is then provided as a separate discrete signal to a respective cell. For example, group 1 of the dividend, containing the most significant ones of said b bits is provided as in input to cell 1, group 2 of the b bits next lowest in the order of place significance is provided as an input to cell 2, and with the P-1 group of b bits provided to cell P-1 and group P of b bits, being the least significant bits of the dividend, being provided to cell P. In this way, the order of the P cells follows the order of the P group of b bits each, derived from the dividend of N bits and the place order of each cell corresponds to the place order of its respective group in the dividend.

Additionally, a divisor signal of n bits is provided as a separate input to each of the cells.

Division is done by a logical process sequentially, starting with the cell containing the most significant of the P groups. As that division is completed, the quotient is stored and any remainder out, as a binary signal or r bits, is transferred, shown in FIG. 1 as a remainder in, to the cell containing the next most significant of the P groups, in the decreasing order of place significance. That cell then logically combines the remainder out from the next higher order cell in the said order of place significance, with the dividend group of b bits provided to that cell and the divisor, to produce a second quotient and a second remainder out of r bits. The remainder out from the second cell is then transferred to the third cell in said descreasing order as a remainder in and the process is repeated with the respective dividend group for each cell and divisor to produce a third quotient and a third remainder out. The sequential process ends with the output of the P cell, which has as its input the remainder P from the P-1 cell and the least significant of the P groups from the dividend to produce a quotient and a final remainder out.

The answer, is then the combined quotients from cells 1, 2, 3, - - - P-1, P, and final remainder out, arranged in their respective order of place significance, relative to the order of the dividend groups from which the respective quotients and final remainder out were derived.

As would be understood by one skilled in the art, the logical process combines the respective dividend group of bits, the respective remainder out from the next higher order cell, and divisor, according to their actual value relative to the order of the dividend group from which these numbers were derived. For example, where the dividend was a sixteen (16) bit number and separated into eight (8) groups, of two (2) bits each and with the least significant bit in the dividend being bit position O and having a value of $2^0$ and the most significant bit having a value of $2^{15}$ then the most significant group of two (2) bits provided to cell one in said order would have the value:

$$X2^{15}+y2^{14},$$

where X and Y randomly would have the value "1" or "0", as is well known in the art.

As cell 1 of the P cells corresponds to the most significant group of bit positions of the dividend, it has no remainder in.

Figure 2:
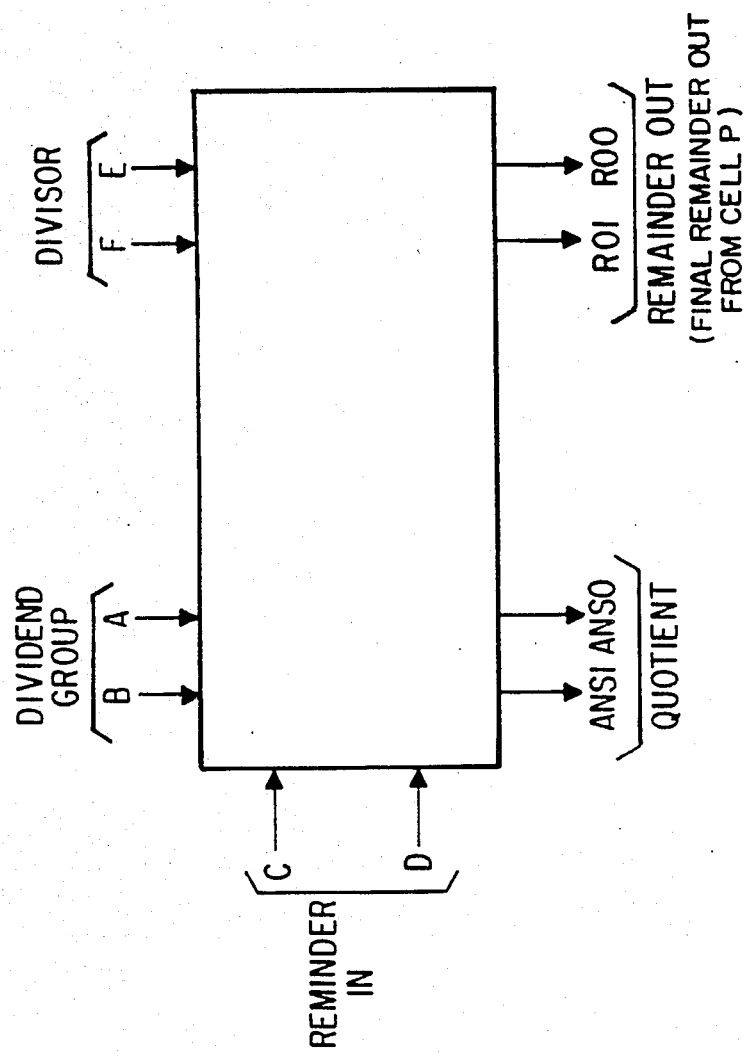
FIG. 2 shows one of the P cells in greater detail, specifically with the input signals to the cell identified.

FIG. 2 is shown a representative divider cell. As shown the 2 bit positions A and B are provided from one of the P dividend groups, the Remainder In is the remainder from the output of cell preceding, in the order of place significance, the Quotient ANS1, ANS0 is the quotient derived from the respective dividend group and the Remainder Out is RO1, RO0. Where the cell is the Pth cell, or lowest cell in the order of place significance, bits A and B would correspond to dividend bit positions 1, 0 respectively and RO1, RO0 would correspond to bit positions 1, 0 of the Final Remainder Out.

The preferred embodiment, showing the application of the inventive principles, uses a divisor cell with a dividend input, of b=2 bits. The divisor is similarly a 2 bit signal. Accordingly, the dividend binary signal of N bits, is divided into P groups of 2 bits each. In the preferred embodiment, the Remainder Out is then a maximum of 2 bits and the Quotient produced by each cell for each respective group of b bits from the respective dividend group, is a maximum of 2 bits. In the example shown below, the combinations of dividend, divisors, quotient, and remainder for each cell is shown for the 2 bit dividend and divisor inputs. However, it should be understood by those skilled in the art and as will be further explained below that according to the inventive principles, the dividend of N numbers may be divided into P groups of b bits where b may be greater than 2 and accordingly, the divisor may be 2 bits or more than 2 bits. Accordingly, the inventive principles can be applied to the process shown below, where that process is expanded to include groups derived from the dividend of N bits, possessing a number of bits in each group greater than 2 and a divisor having a size greater than 2.

According to the preferred embodiment, and since division by 0 is impossible, the binary number 00 is accorded the decimal equivalent value 1 and, as shown for the preferred embodiment, the coding in binary and decimal for Divisor inputs F, E is as shown below.

| Divisor | | |
|---|---|---|
| Binary | | Decimal |
| F | E | |
| 0 | 0 | 1 |
| 0 | 1 | 2 |
| 1 | 0 | 3 |
| 1 | 1 | 4 |

If the divisors otherwise were encoded in normal binary, the pattern 0 0 would be lost for use because division by zero is impossible.

For a given number of bits in the dividend group and divisor and using straightforward arithmetic one can derive a truth table for a division cell. Examples are presented for four different truth tables, one for each divisor and there the number of b bits for each dividend group of said P groups is 2, or a decimal maximum of 4.

TABLE I

For a divisor of 1

| Decimal Remainder IN | Dividend IN | Quotient OUT | Remainder OUT |

TABLE I-continued

For a divisor of 1

| | | | |
|---|---|---|---|
| 0 | 0 | 0 | 0 |
| 0 | 1 | 1 | 0 |
| 0 | 2 | 2 | 0 |
| 0 | 3 | 3 | 0 |

Or in Binary:

| Remainder IN | | Dividend IN | | Quotient OUT | | Remainder OUT | |
|---|---|---|---|---|---|---|---|
| 0 | 0 | 0 | 0 | 0 | 0 | 0 | 0 |
| 0 | 0 | 0 | 1 | 0 | 1 | 0 | 0 |
| 0 | 0 | 1 | 0 | 1 | 0 | 0 | 0 |
| 0 | 0 | 1 | 1 | 1 | 1 | 0 | 0 |

Note that the table contains no entries for a Remainder In from a preceding cell other than zero. This is because when one divides by 1, the remainder from the preceding cell is always 0.

TABLE II

For a divisor of two:

| Decimal Remainder IN | Dividend IN | Quotient OUT | Remainder OUT |
|---|---|---|---|
| 0 | 0 | 0 | 0 |
| 0 | 1 | 0 | 1 |
| 0 | 2 | 1 | 0 |
| 0 | 3 | 1 | 1 |
| 1 | 0 | 2 | 0 |
| 1 | 1 | 2 | 1 |
| 1 | 2 | 3 | 0 |
| 1 | 3 | 3 | 3 |

Or in Binary:

| Remainder IN | | Dividend IN | | Quotient OUT | | Remainder OUT | |
|---|---|---|---|---|---|---|---|
| 0 | 0 | 0 | 0 | 0 | 0 | 0 | 0 |
| 0 | 0 | 0 | 1 | 0 | 0 | 0 | 1 |
| 0 | 0 | 1 | 0 | 0 | 1 | 0 | 0 |
| 0 | 0 | 1 | 1 | 0 | 1 | 0 | 1 |
| 0 | 1 | 0 | 0 | 1 | 0 | 0 | 0 |
| 0 | 1 | 0 | 1 | 1 | 0 | 0 | 1 |
| 0 | 1 | 1 | 0 | 1 | 1 | 0 | 0 |
| 0 | 1 | 1 | 1 | 1 | 1 | 0 | 1 |

Note again that the table stops after a Remainder In of 1. For Division by 2, the remainder from the preceding cell can be no bigger than 1. The Remainder In of 1, represents a value of decimal 4 (binary 100) from the cell next higher in the order of place significance.

TABLE III

For a divisor of 3:

| Decimal Remainder In | Dividend IN | Quotient OUT | Remainder OUT |
|---|---|---|---|
| 0 | 0 | 0 | 0 |
| 0 | 1 | 0 | 1 |
| 0 | 2 | 0 | 2 |
| 0 | 3 | 1 | 0 |
| 1 | 0 | 1 | 1 |
| 1 | 1 | 1 | 2 |
| 1 | 2 | 2 | 0 |
| 1 | 3 | 2 | 1 |
| 2 | 0 | 2 | 2 |
| 3 | 1 | 3 | 0 |
| 2 | 2 | 3 | 1 |
| 2 | 3 | 3 | 2 |

Or in Binary:

| Remainder IN | | Dividend IN | | Quotient OUT | | Remainder OUT | |
|---|---|---|---|---|---|---|---|
| 0 | 0 | 0 | 0 | 0 | 0 | 0 | 0 |
| 0 | 0 | 0 | 1 | 0 | 0 | 0 | 1 |
| 0 | 0 | 1 | 0 | 0 | 0 | 1 | 0 |
| 0 | 0 | 1 | 1 | 0 | 1 | 0 | 0 |
| 0 | 1 | 0 | 0 | 0 | 1 | 0 | 1 |
| 0 | 1 | 0 | 1 | 0 | 1 | 1 | 0 |
| 0 | 1 | 1 | 0 | 1 | 0 | 0 | 0 |
| 0 | 1 | 1 | 1 | 1 | 0 | 0 | 1 |
| 1 | 0 | 0 | 0 | 1 | 0 | 1 | 0 |
| 1 | 0 | 0 | 1 | 1 | 1 | 0 | 0 |
| 1 | 0 | 1 | 0 | 1 | 1 | 0 | 1 |
| 1 | 0 | 1 | 1 | 1 | 1 | 1 | 0 |

Again the table stops at a Remainder In one less than the value of the divisor. A Remainder In of binary 10 (actual binary value = decimal 3) represents a value of 8 (binary 1000), when placed correctly in the order of place significance of the dividend group producing that Remainder In.

TABLE IV

For a divisor of 4:

| Decimal Remainder IN | Dividend IN | Quotient OUT | Remainder OUT |
|---|---|---|---|
| 0 | 0 | 0 | 0 |
| 0 | 1 | 0 | 1 |
| 0 | 2 | 0 | 2 |
| 0 | 3 | 0 | 3 |
| 1 | 0 | 1 | 0 |
| 1 | 1 | 1 | 1 |
| 1 | 2 | 1 | 2 |
| 1 | 3 | 1 | 3 |
| 2 | 0 | 2 | 0 |
| 2 | 1 | 2 | 1 |
| 2 | 2 | 2 | 2 |
| 2 | 3 | 2 | 3 |
| 3 | 0 | 3 | 0 |
| 3 | 1 | 3 | 1 |
| 3 | 2 | 3 | 2 |
| 3 | 3 | 3 | 3 |

Or in Binary:

| Remainder IN | | Dividend In | | Quotient OUT | | Remainder OUT | |
|---|---|---|---|---|---|---|---|
| 0 | 0 | 0 | 0 | 0 | 0 | 0 | 0 |
| 0 | 0 | 0 | 1 | 0 | 0 | 0 | 1 |
| 0 | 0 | 1 | 0 | 0 | 0 | 1 | 0 |
| 0 | 0 | 1 | 1 | 0 | 0 | 1 | 1 |
| 0 | 1 | 0 | 0 | 0 | 1 | 0 | 0 |
| 0 | 1 | 0 | 1 | 0 | 1 | 0 | 1 |
| 0 | 1 | 1 | 0 | 0 | 1 | 1 | 0 |
| 0 | 1 | 1 | 1 | 0 | 1 | 1 | 1 |
| 1 | 0 | 0 | 0 | 1 | 0 | 0 | 0 |
| 1 | 0 | 0 | 1 | 1 | 0 | 0 | 1 |
| 1 | 0 | 1 | 0 | 1 | 0 | 1 | 0 |
| 1 | 0 | 1 | 1 | 1 | 0 | 1 | 1 |
| 1 | 1 | 0 | 0 | 1 | 1 | 0 | 0 |
| 1 | 1 | 0 | 1 | 1 | 1 | 0 | 1 |
| 1 | 1 | 1 | 0 | 1 | 1 | 1 | 0 |
| 1 | 1 | 1 | 1 | 1 | 1 | 1 | 1 |

The highest Remainder In would be binary 11 (actual binary value) equal to decimal 3 but representing an actual value of decimal 12, binary 1100, when placed correctly in the order of place significance of the dividend group producing that Remainder In.

EXAMPLES

The Examples shown here are presented for a series of four 2 bit divider cells, representing the preferred embodiment.

Divide 153 by 3, answer = 51, remainder = 0

-continued

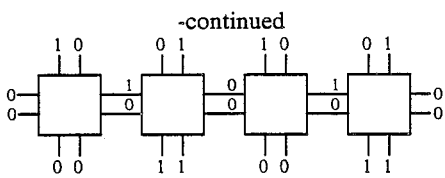

Divide 173 by 2, answer = 86, remainder = 1

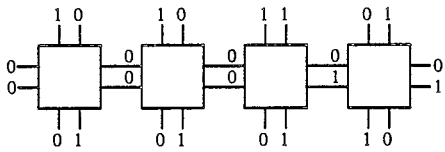

Divide 220 by 3, answer = 73, remainder = 1

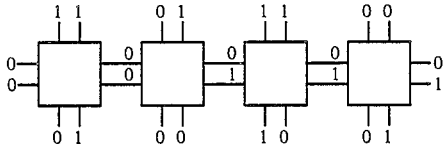

Figure 3:
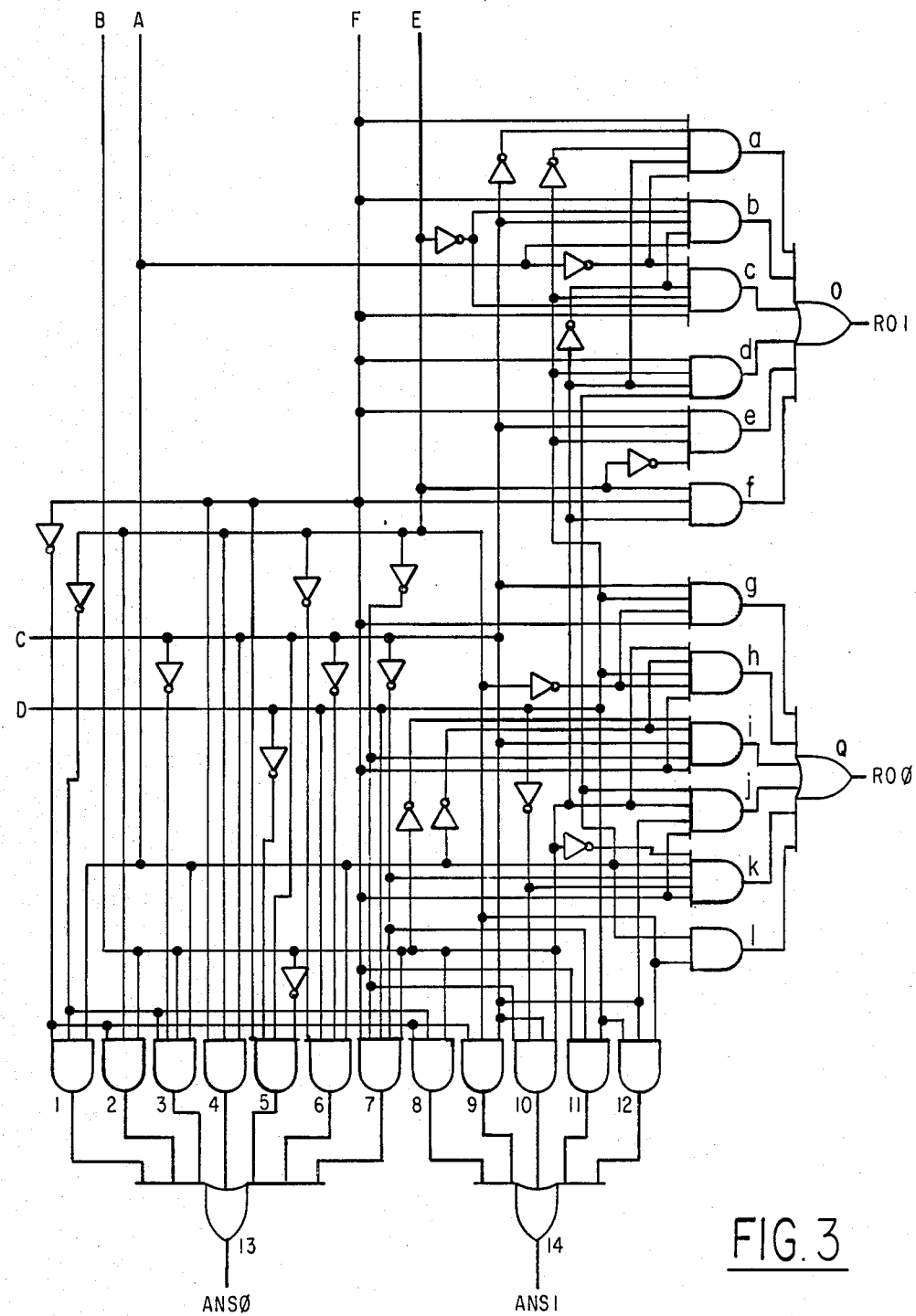
FIG. 3 shows the logical circuitry for the cell of FIG. 2, in greater detail.

The logic for the cell shown in FIG. 2 is shown in FIG. 3. The logic is derived as would be known to one skilled in the art by producing a truth table from Tables I through IV using the computer implementation of the Quine McClousky method as shown in the publication "An Introduction To Computer Logic" by H. Troy Nagle, Jr., B. D. Carol, and J. David Erwin, published by Prentice Hall in 1975.

As shown in FIG. 3 a first set of AND gates 1 through 7 produces, at its output, through Or gate 13, the first bit ANS0 of the quotient and a second set of AND gates 8 through 12 produces, through and Or gate 13, the second bit ANS1 of the quotient for the respective dividend group at input A, B. The remainder output bit RO1 is produced through AND gates a through f, through OR gate 0 and similarly a remainder output b it RO0 is produced through AND gates g through l, through OR gate q. Each of the respective inputs: C, D for the Remainder In, A, B for each dividend group and E, F for the divisor are connected to their respective AND gates according to the logic equation, shown below for the Preferred Embodiment. As stated, to implement a two (2) bit cell, shown in FIG. 3, the Tables I–IV above, is converted to a logic circuit through a logical equation representing these Tables, as stated. The resulting equation given below is the equivalent of the circuit diagram, shown in FIG. 3 and is derived for the Preferred Embodiment.

$ANS0 = (\overline{F}x\overline{E}xA) + (\overline{F}xExB) + (\overline{E}x\overline{C}xBxA) + (Fx\overline{D}xCx\overline{B}) +$ $(\overline{E}xDx\overline{C}xA) + (Fx\overline{E}xDx\overline{C}xB) + (FxExC)$ $ANS1 = (\overline{F}x\overline{E}xB) + (\overline{F}xExC) + (\overline{E}xDxCxB) + (FxDx\overline{C}) +$ $(ExDxC)$ $RO0 = (ExA) + (Fx\overline{D}x\overline{C}xBxA) + (Fx\overline{E}xCx\overline{B}x\overline{A}) +$ $(FxCxBxA) + (Fx\overline{E}xDxBx\overline{A}) + (Fx\overline{E}xDxC)$ $RO1 = (Fx\overline{D}x\overline{C}xBx\overline{A}) + (Fx\overline{E}xCx\overline{B}xA) + (Fx\overline{E}xDx\overline{B}x\overline{A}) +$ $(FxDxBxA) + (FxExB) + (Fx\overline{E}xDxC)$ In the preferred embodiment a string of twelve 2 bit cells is used to produce a divider capable of dividing a 24 bit number by a 2 bit number. However, according to the invention principle, any size of dividend can be accommodated by stringing together more cells. To divide a 64 bit number by a 2 bit number would require thirty two 2 bit cells. There is no reason why the cells cannot work with more than 2 bits at a time. Such as with 4 bits, for example. Using a 4 bit cell, a 24 bit divider can be made with only six cells and a 64 bit divider with 16 cells. The equations for this cell can be derived in the same way as for the 2 bit cell; by deriving the truth tables and then converting to logic equations, as would be known by one skilled in the art.

As general purpose computer must be able to divide by numbers much greater than decimal 4, the divisor also can be expanded. For example, and according to the inventive principles, a cell may be constructed with a 4 bit divisor input. This cell can divide by any number from 1 to 16 (000=1; 1111=16). The number of remainder and quotient bits are similarly expanded because, with a divisor of decimal 16, a remainder out as large as decimal 15 could be produced, requiring 4 bits for the remainder out. The truth tables and equations for this 4 bit cell would be constucted in the manner described above for the 2 bit cell.

One additional feature that could be added to a division cell is the ability to detect a certain type of error. As stated above the remainder into a cell should always be at least one less than the divisor. Additional circuits could be added to a division cell to detect any case where the Remainder In was equal to or larger than the divisor and then set an error bit when this occurs. If error bits are set, then the indication would be one of the cells has malfunctioned or the connections between them have broken.

As would be apparent to one skilled in the art, the inventive principles show a process of cellular division where the dividend is separated into discrete groups. Each of the discrete groups, relative to the value of each such group in the dividend order of place significance, is applied to a division cell. The division cell produces a remainder output, as well as a quotient output, having a value relative to the value of the dividend group and its respective position in the dividend order of place significance. As the cells are similarly arranged for a sequential processing, again in the order of place significance of the dividend group applied to each cell, the remainder out has a value relative to the dividend producing that remainder and that remainder is applied as a remainder in to the next cell in the decreasing order of place significance. As described above, the inventive principles can be applied to any size dividend group and any size divisor. Examples were shown for a dividend group of 2 bits and 4 bits and a divisor of 2 bits or 4 bits. The logic circuitry of each cell was derived by producing truth tables for each combination of dividend, group, remainder in, and divisor, deriving logic equations from those truth tables and then producing the logic circuitry accordingly.

I claim:

1. A method for dividing a number represented as a dividend by a first set of N binary signals, with each of said N binary signals arranged according to an order of place significance, with each place position in said order being indicative of a discrete value, comprising the steps of:

(a) separating said first N binary signal set, representing said dividend into P groups of b signals each, each of said P groups representing a part of said dividend and each of said P groups being in the said order of place significance of its respective b signals in said N binary signal set;
(b) applying said P groups to respective division cells arranged in said order of place significance of their respective P groups;
(c) applying a binary signal representing the divisor to said division cells;
(d) deriving a binary quotient signal and a binary remainder out signal from at least one of said cells;
(e) applying the said remainder out signal from said one cell to the next lower cell in the said order of place significance, as a binary remainder in signal;
(f) sequentially repeating steps (d) and (e) for each of said cells, in the said order of place significance:
(g) combining said quotient signals from each of said cells in their said order of place significance with the remainder out signal from the last of said cells to form the complete quotient and remainder answer.

2. The method of claim 1 wherin said step (f) is a series of separate steps, each of said steps producing a discrete quotient signal and remainder signal out for a respective cell and with each of said separate steps occurring in respective time separated intervals and in the said order of place significance for said respective cells.

3. The method of claim 1 wherein said steps (b) and (c) includes the step (h) of applying said divisor signals and said discrete P groups of dividend signals to separate respective input terminals of said cells.

4. The method of claim 3 wherein said step (d) of deriving includes the step of logically combining said binary dividend and divisor signals to derive said quotient and remainder out signals as binary signals for each respective cell, and
where the least significant first bit of said binary quotient signal (ANS0) is:

$$ANS0 = (\overline{F} \times \overline{E} \times A) + (\overline{F} \times E \times B) + (\overline{E} \times \overline{C} \times B \times A) = \overline{F} \times \overline{D} \times C \times B) = (\overline{E} \times D \times \overline{C} \times A) = -(\overline{E} \times D \times \overline{C} \times B) + (F \times E \times C);$$

and the most significant second bit of said binary quotient signal (ANS1) is:

$$ANS1 = (\overline{F} \times \overline{E} \times B) + (\overline{F} \times E \times C) - + (\overline{E} \times \overline{D} \times C \times B) + (F \times D \times \overline{C}) + (E \times D \times C);$$

where the least significant first bits of said binary remainder out signal is:

$$RO0 = (E \times A) + (F \times \overline{D} \times \overline{C} \times \overline{B} \times A) + (F \times \overline{E} \times C \times \overline{B} \times \overline{A}) + (F \times C \times B \times A) + (F \times \overline{E} \times B \times A) + (-F \times \overline{E} \times D \times C);$$

and the most significant second bit of said binary remainder out signal is $$RO1 = (F \times \overline{D} \times \overline{C} \times B \times \overline{A}) + (F \times \overline{E} \times C \times \overline{B} \times A) + (-F \times \overline{E} \times D \times \overline{B} \times \overline{A}) + (F \times D \times B \times \overline{A}) + (-F \times E \times B) + (F \times \overline{E} \times D \times C);$$

and where:
A is the least significant bit in said binary dividend signal,
B is the most significant bit in said binary dividend signal,
C is the most significant bit of said binary remainder in signal,
D is the least significant bit of said binary remainder in signal,
E is the least significant bit said binary divisor signal, and
F is the most significant bit of said binary divisor signal.

5. A method of producing a binary cellular divider to be used in a binary sequential division process for one of the respective P groups of bits each of a binary dividend signal of N bits with each of the said N bits arranged according to an order of place significance, and with each place position being indicative of a discrete value, and with each P group arranged in the said order of place significance of its respective b bits (where P×b=N) and where the division process takes palce sequentially in each cell, starting with the group of b bits, which are the most significant bits within said binary dividend signal of said N bits and ending with the group of b bits, which are the least significant bits within said binary dividend signal of said N bits and with each cell having as inputs a first set of b bits representing a respective one of said P groups, a second set of s bits representing the bianry divisor signal, a third set of y bits representing the binary remainder in signal to said cellular divider from the next higher cell in said order of place significance, and producing at its output, a respective binary quotient signal in the said order of place significance of its respective P group and a binary remainder out signal, to be applied to the next lower cell in said order or as a final binary remainder out signal where said remainder out is from the lowest of said cells in said order and comprising the steps of:
(a) separating said binary dividend signal of N bits into P groups of b bits each;
(b) deriving a truth table containing entries for the said quotient and remainder out signals for said cellular divider, for discrete values of the said b bits of said dividend, said divisor of s bits, and said remainder in for y bits;
(c) deriving a logical equation, corresponding to the truth table produced in step (b); and
(d) produing a circuit corresponding to said logical equation produced in step (c).

6. The method of claim 5 wherein said number of b bits is at least 2 and said number of n bits in the divisor is at least 2.

7. The method of claim 5 wherein the number of b bits in said dividend is greater than 2 and the number of n bits in the divisor is greater than 4.

8. An apparatus for dividing a number represented as a dividend by a first set of binary signals and arranged according to an order of place significance, with each place position in said order being indicative of a discrete value, comprising:
(a) first means for separating said first binary signal set, representing said dividened of N bits into P groups of b signals each, with each of said P groups representing a part of said dividend and with each of said P groups being in their said order of place significance;
(b) a first cellular division means, said cellular division means having applied to it, as one of its inputs, a first respective one of said P groups of said b signals and with said first cell arranged in the said order of its respective P group and having as a second input a binary signal representing the divisor, and having as a third input, a binary signal representing a remainder out from the next higher cell in said order;

(c) said cellular division means producing a binary quotient signal and a binary remainder out signal in response to said divisor signal, said respective one of said P groups of b signals each, and said remainder signal;

(d) at least a second division means having as its input, a separate second one of said P groups of b signals each of said dividend, said divisor signal and as a binary remainder in signal, the said binary remainder out signal from the said first said division means and responsive to said input signals producing a binary quotient signal, and a binary remainder out signal, (e) means for combining said quotient signals from each of said cellular division means, in the order of place significance of their respective dividend P groups producing said respective quotients, and with the remainder out from said last cell to form a complete quotient and remainder answer.

9. An apparatus for dividing a dividend represented by a binary dividend signal of N bits, by a binary divisor comprising:

(a) a plurality of cellular dividing means, each cellular dividing means having a first input for receiving one of a plurality of P separate groups of b bits of said binary dividend, signal, where b is less than N;

(b) said plurality of cellular dividing means being arranged in an order of place significance related to the order of place significance of respective ones of said P groups in said N bit dividend signal;

(c) said cellular dividing means having a second input for receiving a binary divisor;

(d) said cellular dividing means having a third input for receiving a binary remainder in from the next higher cellular dividing means in said order of place significance;

(e) said cellular dividing means having a first output means for providing part of the binary quotient, in the said order of place significance of the said respective P group and a second output for providing a remainder out, and with said binary remainder out being the remainder in to the next lower cell in the said order of place significance or being the final remainder out of the lowest of said cellular dividing means in said order of place significance; and (f) means for arranging said quotients from each respective celular dividing means and said remainder out from said lowest order cell to from the binary quotient and remainder.

10. The apparatus of claim 9 where said cellular dividing means is described by the following logic function:

where the least significant first bit of said binary quotient signal (ANS0) is:

$$ANS0 = (\overline{F} \times \overline{E} \times A) + (\overline{F} \times E \times B) + (\overline{E} \times \overline{C} \times B \times A \times) + (F \times \overline{D} \times C \times \overline{B} \times) + (\overline{E} \times D \times \overline{C} \times A) + (F \times E \times D \times \overline{C} \times B) + (F \times E \times C);$$

and the most significant second bit of said binary quotient signal (ANS1) is:

$$ANS1 = (F \times \overline{E} \times B) + (\overline{F} \times E \times C) + (\overline{E} \times \overline{D} \times C \times B) + (F \times D \times \overline{C}) + (E \times D \times C);$$

where the least significant first bit of said binary remainder signal RO0 is:

$$RO0 = (E \times A) + (F \times \overline{D} \times \overline{C} \times \overline{B} \times A) + (F \times \overline{E} \times C \times B \times \overline{A}) + (F \times C \times B \times A) + (F \times \overline{E} \times D \times B \times \overline{A}) + (F \times \overline{E} \times D \times C);$$

and the most significant second bit of said binary remainder signal RO1 is:

$$RO1 = (F \times \overline{D} \times \overline{C} \times B \times \overline{A}) + (F \times \overline{E} \times C \times \overline{B} \times A) + (F \times \overline{E} \times D \times \overline{B} \times \overline{A}) + (F \times D \times B \times A \times) + (F \times E \times B) + (F \times \overline{E} \times D \times C);$$

and where:

A is the least significant bit in said binary dividend signal,

B is the most significant bit in said binary dividend signal,

C is the most significant bit of said binary remainder in signal,

D is the least significant bit of said binary remainder in signal,

E is the least significant bit of said binary divisor signal, and

F is the most significant bit of said binary divisor signal.

* * * * *